US005140130A

United States Patent [19]

Sakuragi et al.

[11] Patent Number: 5,140,130

[45] Date of Patent: Aug. 18, 1992

[54] CONSTRUCTION OF NOZZLE FOR PLASMA CUTTING TORCH

[75] Inventors: Shun-ichi Sakuragi; Yoshihiro Yamaguchi, both of Kanagawa, Japan

[73] Assignee: Kabushiki Kaisha Komatsu Seisakusho, Tokyo, Japan

[21] Appl. No.: 622,744

[22] Filed: Dec. 5, 1990

[51] Int. Cl.[5] .................... B23R 9/00

[52] U.S. Cl. .................... 219/121.5; 219/121.48; 219/121.39; 219/75

[58] Field of Search .................... 219/74, 75, 121.48, 219/121.5, 121.51, 121.52, 121.54, 121.39

[56] References Cited

U.S. PATENT DOCUMENTS 3,818,175 6/1974 Essers et al. .................... 219/121.5
3,914,573 10/1975 Muehlberger .................... 219/121.5
4,506,136 3/1985 Smyth et al. .................... 219/121.5
4,954,688 9/1990 Winterfeldt .................... 219/121.5

Primary Examiner—Mark H. Paschall
Attorney, Agent, or Firm—Frost & Jacobs

[57] ABSTRACT

A plasma cutting torch comprising: a gas current generator having at least one orifice which is formed in a working gas passage defined between the outer peripheral surface of an electrode and the inner peripheral surface of a nozzle disposed so as to surround the electrode and which extends substantially in parallel relationship with the longitudinal axis of said electrode, wherein in case the restricted area of the orifice of the gas current generator is expressed by S5 and the restricted area of a nozzle orifice of the nozzle is expressed by S4, the relation between the two is expressed by $S5 \geqq S4$. The plasma cutting torch is further provided with a generally cylindrical space portion formed on the upstream side of the nozzle orifice defined in the leading end portion of the nozzle and having a diameter larger than the diameter of the nozzle orifice.

7 Claims, 5 Drawing Sheets

CONSTRUCTION OF NOZZLE FOR PLASMA CUTTING TORCH

BACKGROUND OF THE INVENTION

1. Field of the Invention

This invention relates to a construction of a nozzle of plasma cutting torch.

2. Description of the Prior Art

A prior art plasma cutting torch of the kind specified above is described with reference to FIG. 1. The plasma cutting torch shown in FIG. 1 is constituted by a power supply system 16 which is comprised of a direct-current power supply 7, an electrode 1 connected by a connection with a negative pole of the d.c. power supply 7, a high frequency circuit 8 including a coupling coil 9 connected with the above-mentioned connection, a nozzle 2 connected by a connection in parallel with a positive pole of the d.c. power supply (This circuit includes a resistance 12 and an opening/closing switch 11 connected in series), a workpiece 6, and a bypass circuit including a bypass capacitor 10 for bypassing the d.c. power supply; a working gas supply system 17 for supplying a working gas from a gas supply source 13 through a gas pressure regulator 14 and a solenoid valve 15 into the nozzle 2; and a torch body system 18 which is comprised of the electrode 1, the nozzle 2 surrounding the electrode 1 and a gas passage 19 defined between the electrode 1 and the nozzle 2. (Although not shown in the drawing, in case the nozzle is of a water-cooled type, a water cooling unit is provided.) How to generate plasma arc in such a configuration will be described below. In the first place, the pressure of a gas supplied from a gas supply source 13 is regulated by the gas pressure regulator 14 connected thereto at a predetermined pressure P1. Thereafter, the solenoid valve 15 is opened and supply of the working gas into the nozzle 2 is commenced.

When the d.c. power supply is switched on, a voltage is applied between the electrode 1 (cathode) and the nozzle (anode), and a different voltage is applied between the electrode (cathode) and the workpiece 6 (anode). When a high frequency voltage is applied subsequently between the electrode 1 and the nozzle 2 through the high frequency circuit 8, a high frequency discharge will occur there-between, thus causing a dielectric breakdown in the space between the tip of the electrode 1 and the tip of the nozzle 2, thus causing a d.c. arc, i.e. a pilot arc between the electrode 1 and the workpiece 6. When conduction between the electrode 1 and the workpiece 6 is secured by the pilot arc, the opening/closing switch 11 is opened so as to generate a plasma arc between the electrode 1 and the workpiece 6, thus commencing cutting of the workpiece 6. Stating in brief, the plasma cutting is meant by fusion cutting of the workpiece 6 using the energy produced when the working gas is over-heated to a high temperature by drawing the arc discharge between the electrode 1 and the workpiece 6 thinly through a nozzle orifice 4.

The prior art plasma cutting torch having the above-mentioned configuration has, however, the following disadvantage.

Since the prior art plasma cutting torch is arranged such that, as mentioned above, the workpiece 6 is subjected to fusion cutting using the energy produced when the working gas is overheated to a high temperature by drawing the arc discharge between the electrode 1 and the workpiece 6 thinly through the nozzle orifice 4, as the discharge electric current is increased, the energy of the plasma arc will increase, thereby increasing the cutting capacity. In this case, however, there is a problem in that with increase in the value of discharge electric current an abnormal discharge referred to as "double arc" will occur and bring forth a disadvantage such as damage of the plasma nozzle (stating accurately, the nozzle of the plasma nozzle. To cope with this difficulty, when the prior art plasma cutting torch is used, it is necessary to control the discharge current so as to keep it less than a critical electric current at which double arc occurs.

(1) Point at issue in controlling critical electric current by increasing the gas supply pressure:

As can be seen from FIG. 3, since the critical electric current at which double arc occurs is raised by increasing the working gas supply pressure, the increase in the working gas supply pressure provides an advantage in that the resultant increase in the discharge electric current will improve the cutting capacity, whereas there is a disadvantage in that, as shown in FIG. 4, as the working gas supply pressure is increased the dielectric breakdown voltage at the time of application of a high frequency voltage for striking arc is also increased thus making it difficult to cause the dielectric breakdown. In other words, this is a disadvantage that it becomes difficult to generate arc. (Further, even if the dielectric breakdown voltage is raised, the generation of breakdown can be promoted by increasing the level of the high frequency output to be applied between the electrode and the nozzle, whereas the increase in the level of the high frequency output brings forth not only a disadvantage that the dielectric strength of every portion of the power supply must be improved, but also another difficulty that as the high frequency output increases the electrical noise generated by the plasma cutting torch will also increase.)

(2) Point at issue in controlling critical electric current by changing over the gas supply pressure:

As an alternative to the above-mentioned method of controlling the critical electric current by increasing the working gas supply pressure, there is another method of controlling the critical electric current by changing over the working gas supply pressure. This method of controlling the discharge electric current comprises the steps of lowering the working gas supply pressure by means of the gas pressure regulator 14 when striking arc, and raising the gas supply pressure after striking of arc has occurred. This controlling method requires regulation of the gas pressure regulator 14 to be made each time arc is struck or suppressed, and is therefore disadvantageous in that striking of arc cannot be effected smoothly.

FIG. 2 is an enlarged view of the nozzle portions of the above-mentioned prior art plasma cutting torch. As shown in FIG. 2, the nozzle portion of the plasma cutting torch is comprised of an electrode 1 and a nozzle 2 disposed so as to define a working gas passage 19 which surrounds the electrode 1, and the nozzle 2 has a cylindrical nozzle orifice 4 formed through its leading end portion 4*a*.

In this prior art nozzle portion, in case a pilot arc 20 is generated when starting the plasma cutting torch, an anodic point is formed on the surface of the inner wall of the nozzle 2. Until a predetermined migrating electric current flows, this anodic point is moved by the flow of the working gas from the surface of the inner wall of the nozzle 2 to the leading end portion 4a of the nozzle orifice 4 of the nozzle 2 and held there for some time. In this condition, the leading end portion 4a of the nozzle orifice 4 having the anodic point formed thereon is worn away and deteriorated thus deteriorating the quality of the workpiece to be cut.

SUMMARY OF THE INVENTION

The present invention has been made in view of the above-mentioned circumstances in the prior art and has for its first object to provide a construction of a nozzle for use in a plasma cutting torch which enables striking of arc to be made without fail even in a high working gas pressure condition, and which enables a high electric current to be supplied to the nozzle orifice.

Further, a second object of the present invention is to provide a construction of a nozzle for use in a plasma cutting torch arranged such that a migrating power supply is formed before the anodic point reaches the lower end of the nozzle orifice.

To achieve the above-mentioned first object, according to a first aspect of the present invention, there is provided a plasma cutting torch comprising: a gas current generator having at least one orifice which is formed in a working gas passage defined between the outer peripheral surface of an electrode and the inner peripheral surface of a nozzle disposed so as to surround the electrode and which extends in parallel relationship with the longitudinal axis of the electrode, wherein in case the restricted area of the orifice of the gas current generator is expressed by S5 and the restricted area of a nozzle orifice of the nozzle is expressed by S4 the relation between the two is expressed by $S5 \geqq S4$.

In the plasma cutting torch as set forth in the above-mentioned first aspect, the relation between the above-mentioned S4 and S5 is further expressed by $S4 \geqq S5 \geqq \frac{3}{4} \times S4$.

Further, according to a second aspect of the present invention, there is provided a plasma cutting torch as set forth in the above-mentioned first aspect, wherein the gas current generator has a plurality of the above-mentioned orifices disposed symmetrically about the axis of the electrode with one another around the electrode.

In the plasma cutting torch as set forth in the above-mentioned second aspect, if the total restricted area of the plurality of orifices is expressed by S5n, the relation between S5n and the restricted area S4 of the nozzle orifice of the above-mentioned nozzle is expressed by $S4 \geqq S5n \geqq \frac{3}{4} \times S4$.

To achieve the above-mentioned first and second objects, according to a third aspect of the present invention, there is provided a plasma cutting torch comprising: a gas current generator having at least one orifice which is formed in a working gas passage defined between the outer peripheral surface of an electrode and the inner peripheral surface of a nozzle disposed so as to surround the electrode and which extends substantially in parallel with the longitudinal axis of the electrode; and a substantially cylindrical space portion formed on the upstream side of a nozzle orifice formed in the leading end portion of the nozzle and having a diameter larger than the diameter of the nozzle orifice, and wherein in case the restricted area of the orifice of the above-mentioned gas current generator is expressed by S5 and the restricted area of the nozzle orifice of the above-mentioned nozzle is expressed by S4 the relation between the above-mentioned S4 and S5 is further expressed by $S4 \geqq S5 \geqq \frac{3}{4} \times S4$.

Further, according to a fourth aspect of the present invention, there is provided a plasma cutting torch as set forth in the above-mentioned third aspect, wherein the gas current generator has a plurality of the above-mentioned orifices disposed symmetrically about the axis of the electrode with one another around the electrode.

In the plasma cutting torch as set forth in the above-mentioned fourth aspect, if the total restricted area of the plurality of orifices is expressed by S5n the relation between S5n and the restricted area S4 of the nozzle orifice of the above-mentioned nozzle is expressed by $S4 \geqq S5n \geqq \frac{3}{4} \times S4$.

In the plasma cutting torch as set forth in the above-mentioned third aspect, the space portion is comprised of multiple-stage space portions whose diameters are reduced stepwise towards the nozzle orifice.

According to the present invention having the above-mentioned aspect, it is possible to strike arc without fail even in a high working gas supply pressure condition, and pass a higher electric current to the nozzle orifice so that a plasma arc having a high electric current density is obtained and the capacity of the plasma cutting torch nozzle can be improved markedly.

Further, according to the present invention, since the arrangement is made to form a migrating electric power supply before the anodic point reaches the lower end of the nozzle, the quality of a workpiece to be cut can be maintained without wearing away and deteriorating the leading end portion of the nozzle.

The above-mentioned and other objects, aspects and advantages of the present invention will become apparent to those skilled in the art by making reference to the following description and the accompanying drawings in which preferred embodiments incorporating the principles of the present invention are shown by way of example only.

DETAILED DESCRIPTION OF PREFERRED EMBODIMENTS

The present invention will now be described below by way of several preferred embodiments and modifications thereof with reference to the accompanying drawings.

In the first place, the first embodiment of the present invention will be described with reference to FIG. 5.

Figure 1:
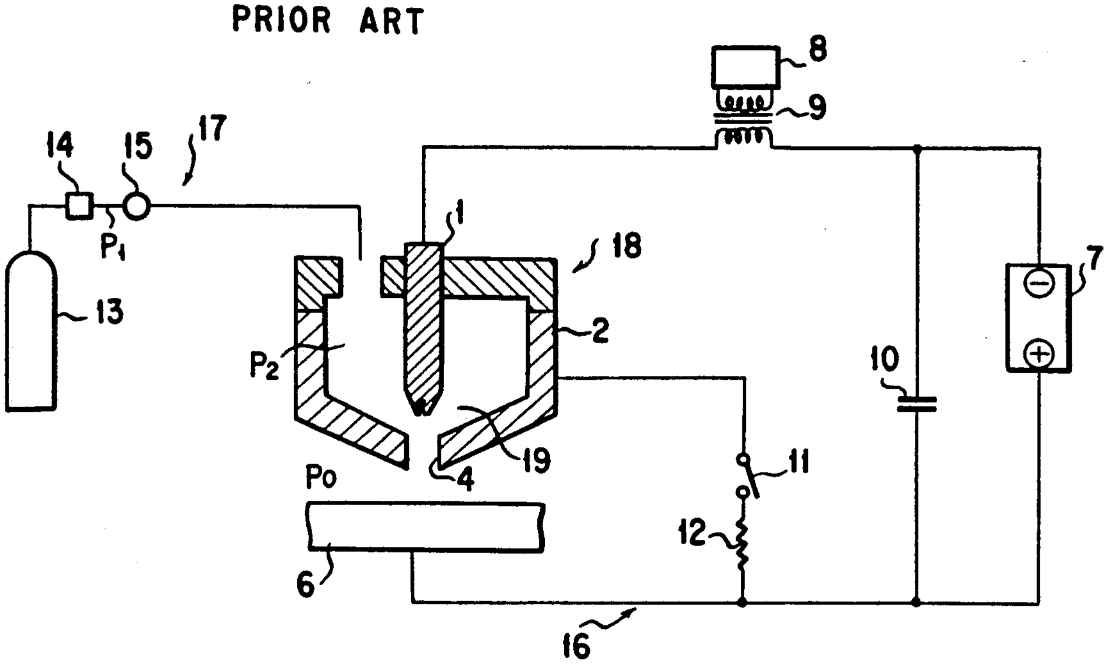
FIG. 1 PRIOR ART
FIG. 1 is an overall, schematic configurational explanatory view showing a prior art example of the plasma cutting torch.
Figure 2:
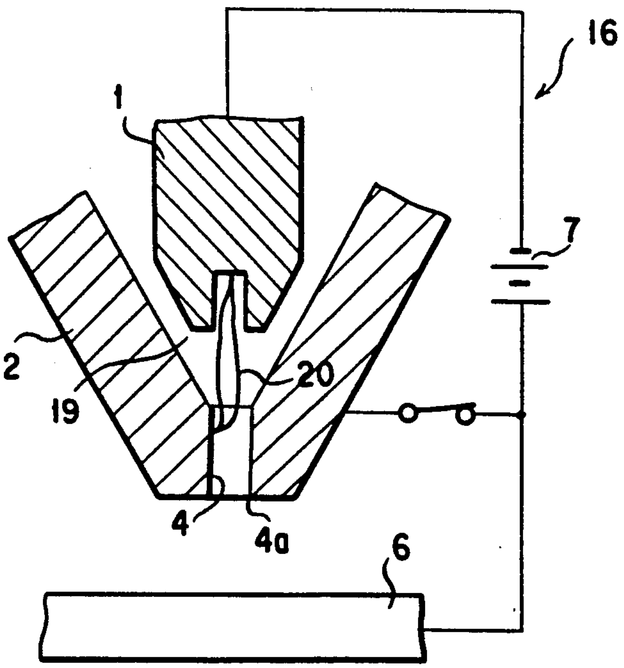
FIG. 2 PRIOR ART
FIG. 2 is an enlarged sectional view of the nozzle portion of the prior art example.
Figure 3:
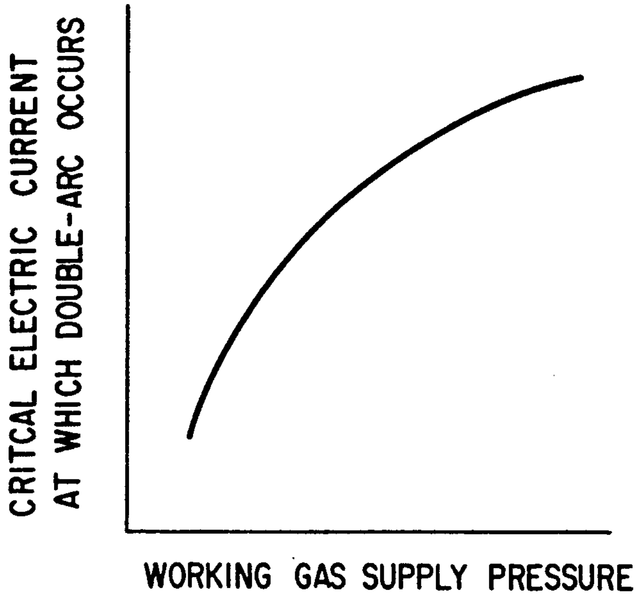
FIG. 3 is a graph showing the relationship between the critical electric current at which double arc occurs and the working gas supply pressure.
Figure 4:
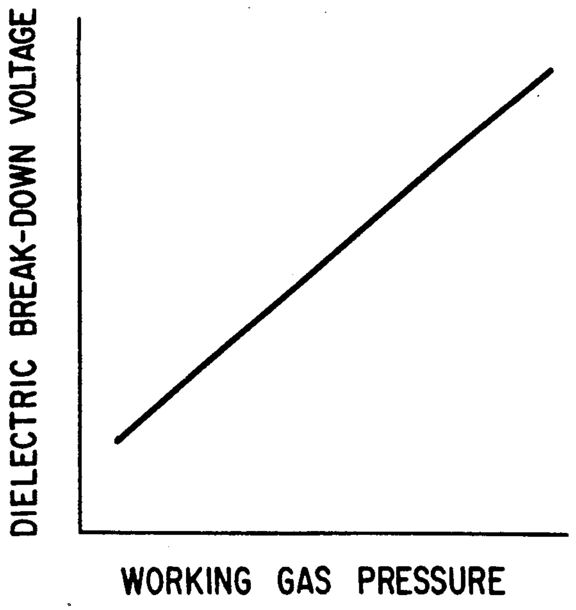
FIG. 4 is a graph showing the relationship between the dielectric breakdown voltage and the pressure of working gas.
Figure 5:
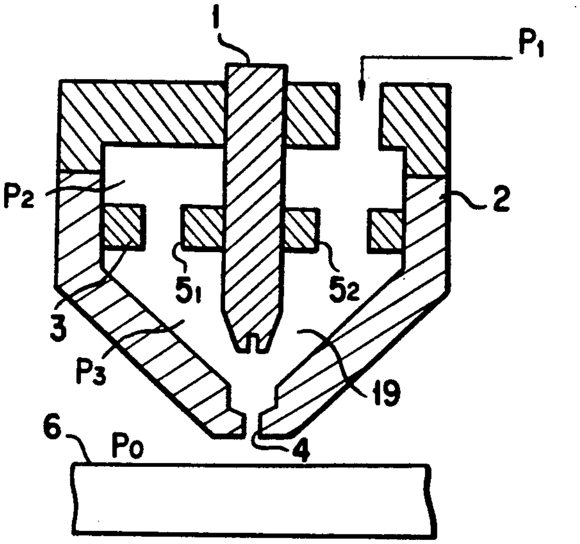
FIG. 5 is a sectional view showing the principal parts of a first embodiment of the present invention.

The plasma cutting torch according to the first embodiment shown in FIG. 5 comprises component elements which are omitted in FIG. 5 and which are identical to those of the aforementioned prior art example shown in FIG. 1; that is to say, a power supply system 16 which is comprised of a direct-current power supply 7, an electrode 1 connected by a connection with a negative pole of the d.c. power supply 7, a high frequency circuit 8 including a coupling coil 9 connected with the above-mentioned connection, a nozzle 2 connected by a connection in parallel with a positive pole of the d.c. power supply (This circuit includes a resistance 12 and an opening/closing switch in series), a workpiece 6, and a bypass circuit including a bypass capacitor 10 for bypassing the d.c. power supply; a working gas supply system 17 for supplying a working gas from a gas supply source 13 through a gas pressure regulator 14 and a solenoid valve 15 into the nozzle 2; and a torch body system 18 which is comprised of the electrode 1, the nozzle 2 surrounding the electrode 1 and a gas passage 19 defined between the electrode 1 and the nozzle 2.

This first embodiment differs from the prior art example shown in FIG. 1 in that, as is apparent from FIG. 5, it comprises a gas current generator 3 in the working gas passage 19 of the torch body system 18. The gas current generator 3 has at least one orifice 5 (two orifices $5_1$ and $5_2$ are shown in FIG. 5) which divides the working gas passage 19 into a chamber in which the working gas is once accumulated, and a chamber in which the working gas is accumulated for discharge. Further, the arrangement is made such that the restricted area S5 of the orifice 5 or the total restricted area S5n of the orifices $5_1$ and $5_2$ is less than the restricted area S4 of nozzle orifice 4. Stating more specifically, according to the present invention, the gas current generator 3 comprising one orifice 5 provides a plasma cutting torch arranged such that the relationship between the restricted area S5 of the orifice 5 and the restricted area S4 of the nozzle orifice 4 is expressed by $S4 \geqq S5 \geqq \frac{1}{3} \times S4$, whilst the gas current generator 3 comprising a plurality of orifices 5 provides a plasma cutting torch arranged such that the relationship between the total restricted area S5n of the orifices 5 and the restricted area S4 of the nozzle orifice 4 is given by $S4 \geqq S5n \geqq \frac{1}{3} \times S4$.

Further, the orifice 5 is formed in the gas current generator 3 so as to pass therethrough in a direction substantially parallel to the longitudinal axis of the electrode 1, whilst in case a plurality of orifices are provided the orifices are formed through the gas current generator 3 around the electrode 1 and at symmetrical positions about the axis of the electrode 1.

The operation of the above-mentioned embodiment will be described with reference to FIG. 6.

Figure 6:
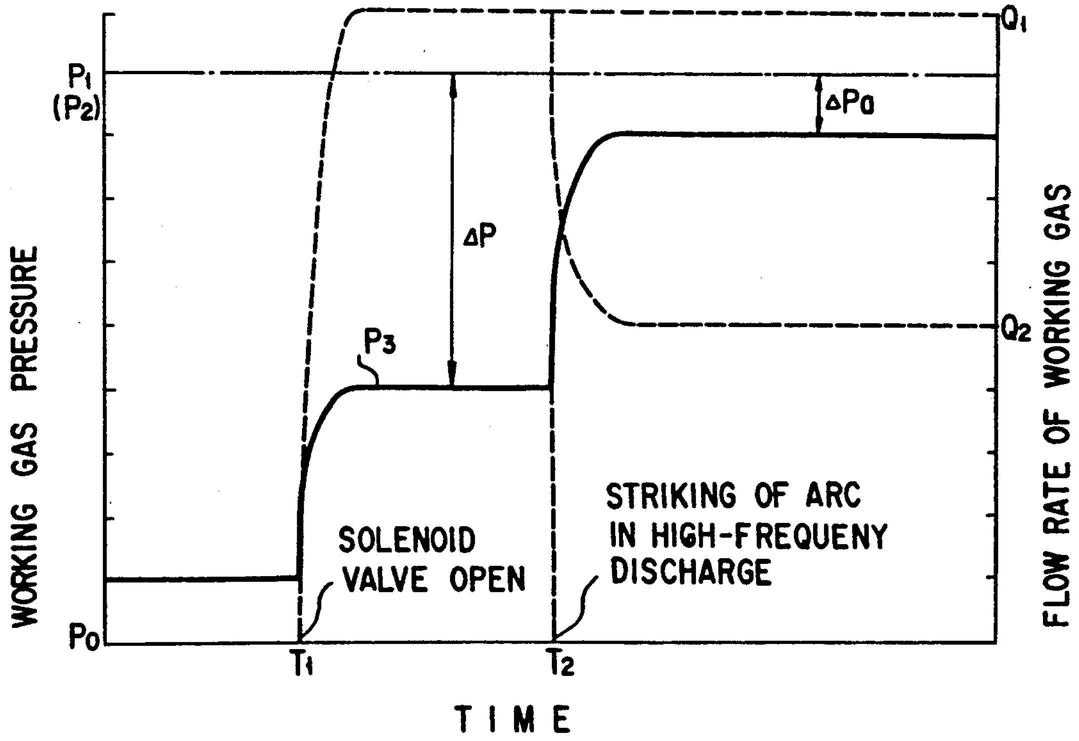
FIG. 6 is a diagram showing the operation of the first embodiment shown in FIG. 5.

FIG. 6 shows variations in the pressure P3 of the working gas in the discharge portion (shown by a solid line) and the flow rate of the working gas (shown by a broken line) at time T1 and T2. If the solenoid valve 15 is opened at time T1 to supply the working gas into the plasma discharge nozzle, the gas pressure in the discharge portion of the nozzle will rise from the surrounding air pressure PO (atmospheric pressure) to P3. The gas pressure P2 in the nozzle is approximately equal to the pressure P2 of the gas supplied, i.e. P2≈P1, because the pressure losses of the gas through the gas pressure regulator 14 and the gas tube, etc. are usually negligibly small.

Whilst, the pressure loss ΔP due to the orifice 5 of the gas current generator 3 is high, whilst the gas pressure P3 in the discharge portion is not so much higher than the atmospheric pressure PO as shown by the following formula.

$$\Delta P = P2 - P3 \approx P1 - P3$$

It is because the pressure loss ΔP of the working gas due to the orifice 5 is high enough to suppress the rise in gas pressure P3 in the discharge portion. The flow rate Q1 of the working gas at that time depends on the orifice 5 rather than the nozzle orifice 4. With a high frequency kept at a high voltage applied at time T2, since the gas pressure P3 in the discharge portion is not high, a dielectric breakdown will occur readily, thus ensuring striking of arc. When striking of arc occurs, the working gas passing through the nozzle orifice 4 is heated and expanded by the discharge electric current so that the flow resistance due to the nozzle orifice 4 will increase thus reducing the flow rate of the gas from Q1 to Q2. In this case, the flow rate Q2 of the working gas depends mainly on the nozzle orifice 4. The plasma arc passing through the nozzle orifice 4 will be kept at a high temperature of 10,000 degrees C. or above, and the nozzle orifice 4 is choked with the gas, and so the flow rate of the gas is determined by the choked portion of the nozzle orifice 4. With the reduction of the flow rate of the working gas from Q1 to Q2, the pressure loss in the orifice 5 will decrease from ΔP to ΔPa. This is because the pressure loss is approximately proportional to square of the flow rate.

$$\Delta P \propto Q^2$$

As a result of the reduction in the pressure loss in the orifice 5, the gas pressure P3 in the discharge portion will rise inversely and come close to the gas supply pressure P1 so that a workpiece can be cut under a high gas pressure condition.

In case the plasma cutting torch is not provided with the orifice 5 as in case of the prior art example, or in case the torch is provided with the orifice 5, but the area of aperture of the orifice is larger than that of the nozzle orifice 4, the pressure loss ΔP will reduce, and as a result the gas pressure P2 in the nozzle becomes substantially equal to the gas pressure P3 in the discharge portion so that simultaneously with opening of the solenoid valve 15 the gas pressure P3 in the discharge portion rises up to the nearly same value sa the gas supply pressure P1 rendering it difficult to cause dielectric breakdown.

The smaller the area of aperture of the orifice 5, the larger the pressure ΔP becomes so that the rise in the gas pressure before discharge is restrained, while the pressure loss ΔP after the discharge will also increase correspondingly, and therefore the gas supply pressure P1 has to be set previously higher by a value equal to ΔPa. Stating in brief, it is desirable to set the area of aperture of the orifice 5 so as to keep the value of ΔP sufficiently small, although it is preferable to keep the value of ΔP as high as possible. According to the result of experiments, it was found out that an excellent result is obtained when the restricted area S5 of the orifice 5 has the following relation to the restricted area S4 of the nozzle orifice 4.

$$S4 \geqq S5 \geqq \tfrac{1}{2} \times S4 \text{ or } S4 \geqq S5n \geqq \tfrac{1}{2} \times S4$$

Further, the gas current generator 3 may be located at any position in the gas passage, however, the more distant from the nozzle orifice 4 the gas current generator 3 is located the more the time delay in increase in the gas pressure P3 in the nozzle portion, and therefore it is desirable to locate the gas current generator 3 as near the nozzle orifice 4 as possible.

According to each of the above-mentioned first embodiment and modification thereof, there is provided a plasma cutting torch which is configured aiming at the pressure loss of the working gas in the orifice (that is; the pressure loss of the working gas when passing through the orifice 5 provided in the gas current generator 3 and the pressure loss of the gas passing through the nozzle orifice 4), and which is designed to utilize a sharp change in the flow resistance of the working gas in the nozzle orifice 4 before and after striking of arc so as to enable the working gas pressure P3 in the discharge portion before striking of arc (i.e., when a dielectric breakdown is caused by a high-frequency voltage before striking of arc) to be kept at a low value and the gas pressure P3 to be raised to a high value momentarily after the generation of arc, while the gas supply pressure P1 is kept constant.

Figure 7:
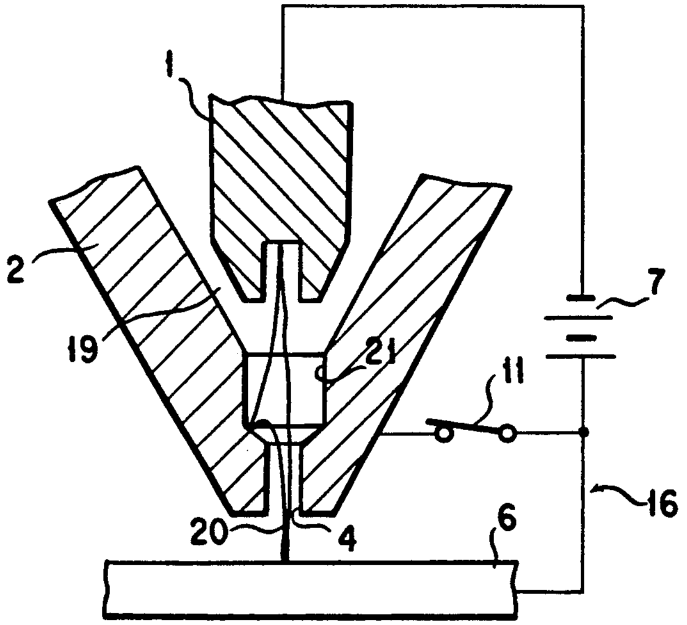
FIG. 7 is a sectional view showing the principal parts of a second embodiment of the present invention.

Subsequently, the second embodiment of the present invention will be described with reference to FIG. 7. This plasma cutting torch is constituted by an electrode 1 and a nozzle 2 installed so as to form a working gas passage 19 surrounding the electrode 1. The nozzle 2 is provided with a nozzle orifice 4 for spouting the working gas. Formed above the nozzle orifice 4, i.e. on the upstream side of the working gas is a generally cylindrical space 21 having a diameter three to six times as large as that of the nozzle orifice 4. Reference numeral 6 denotes a workpiece connected through an electric circuit 16 with the positive pole of a power supply 7. Reference numeral indicates a contact which makes and breaks between the nozzle 2 and the power supply 7.

In the above-mentioned configuration, when this plasma cutting torch is started, oxygen gas from a working oxygen supply source, not shown, is supplied into the nozzle 2 and spouted through the working gas passage 19, the space 21 and the nozzle orifice 4 towards the workpiece 6. Further, a voltage is applied between the electrode 1 and the nozzle 2 to generate a pilot arc between the electrode 1 and the space portion 21 in the nozzle 2, and an anodic point is moved downward by the flow of the working gas. But, since the flow velocity of the working gas is low due to the large diameter of the space portion 21, the moving speed of the anodic point becomes slow. And, a migrating electric current can be generated until the anodic point reaches the lower end of the nozzle 2, thereby generating arc between the electrode 1 and the workpiece 6.

Figure 8:
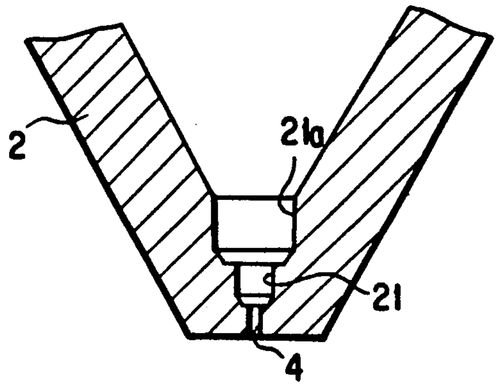
FIG. 8 is a sectional view showing a modification of the second embodiment show in FIG. 7.

In the next place, a modification of the second embodiment will be described with reference to FIG. 8.

In this drawing, reference numeral denotes a nozzle of this plasma cutting torch. The nozzle 2 is provided with a nozzle orifice 4. Further, formed above the nozzle orifice 4, i.e. on the upstream side of the flow of working gas is a cylindrical space portion 21 having a diameter three to six times as large as that of the nozzle orifice 4. Still further, formed above the space portion 21 is another cylindrical space portion 21a having a diameter larger than that of the space portion 21. Therefore, this embodiment comprises two-stage space portions formed therein.

Figure 9:
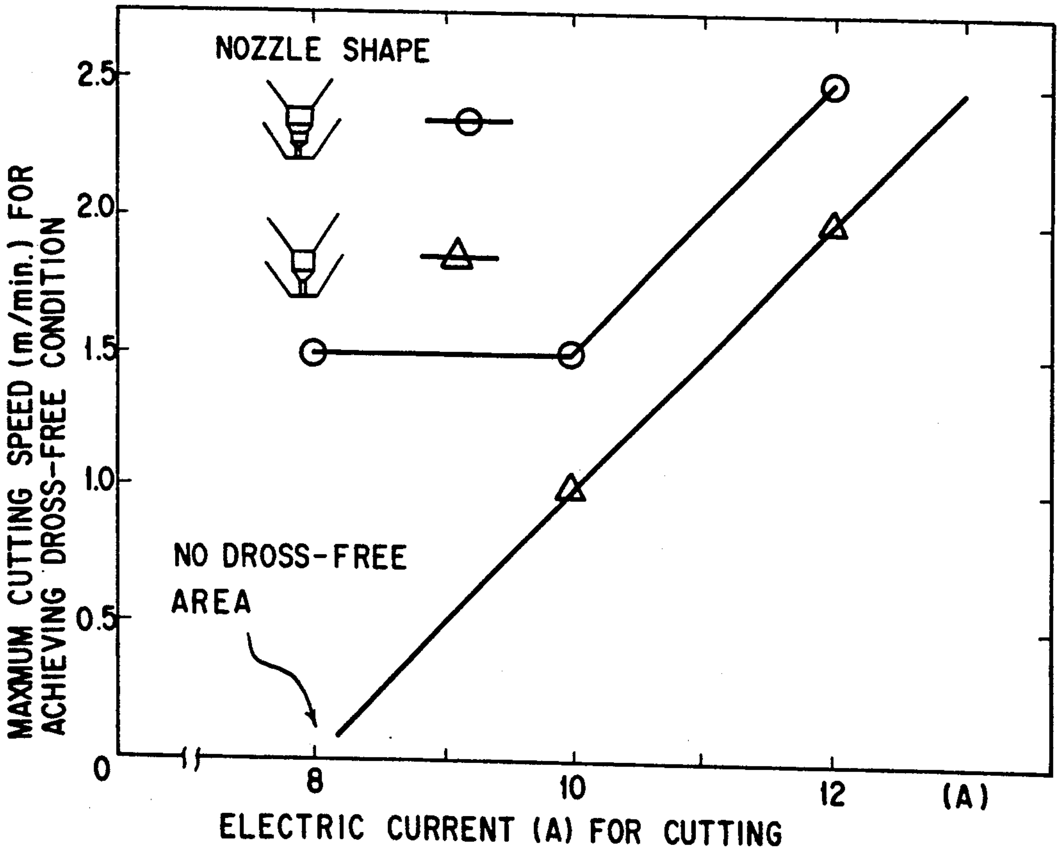
FIG. 9 is a graph showing the maximum cutting speed for achieving dross-free condition relative to the electric current for cutting a workpiece.

In such a configuration, since the movement of the anodic point becomes slow in the same manner as described in the second embodiment, and also the working gas flows through the space portions 21a and 21 and the nozzle orifice 4, the inside diameters of which are sequentially reduced, the working gas is accelerated gradually. As a result, the generation of turbulent flow of the gas is limited, and so losses of a variety of energies (For instance, thermal energy, kinetic energy) will be reduced. FIG. 9 is a graph showing that the loss of energy which occurs in case of the nozzle 2 comprising the two space portions 21 and 21a formed above the nozzle orifice 4 is less than that which occurs in case of the nozzle 2 comprising only one space portion 21 formed above the nozzle orifice 4. This graph shows maximum cutting speeds for achieving dross-free condition against electric current for cutting when the current intensity is changed variously to cut an SPC material 1.6 mm thick as a workpiece using oxygen as working gas. This graph indicates clearly that the loss of energy which occurs in case of the nozzle 2 comprising the two space portions 21 and 21a formed above the nozzle orifice 4 is less than that which occurs in case of the nozzle 2 comprising only one space portion 21 formed above the nozzle orifice 4 and the maximum cutting speed for achieving dross-free condition by the former is higher than that by the latter.

While, in the above-mentioned modification, an example comprising the two cylindrical space portions 21 and 21a has been described, it is needless to say that the number of the space portions is not to be limited to two, and multiple stages of space portions can also be provided.

It is to be understood that the foregoing description is merely illustrative of preferred embodiments of the present invention, and that the scope of the present invention is not to be limited thereto, but is to be determined by the scope of the appended claims.

What is claimed is:

1. A plasma cutting torch comprising: a gas current generator which is formed in a working gas passage defined between an outer peripheral surface of an electrode and an inner peripheral surface of a nozzle, said nozzle being disposed so as to surround the electrode and having a nozzle orifice formed at the leading end thereof so as to communicate with said working gas passage, and which has at least one orifice formed therein so as to extend substantially in parallel relationship with a longitudinal axis of said electrode, wherein in case a restricted area of the orifice of said gas current generator is expressed by S5 and, on the other hand, a restricted area of said nozzle orifice is expressed by S4, the relation between the two areas is expressed by $S4 \geqq S5 \geqq \tfrac{1}{2} \times S4$.

2. A plasma cutting torch as claimed in claim 1, characterized in that said gas current generator has a plurality of said orifices disposed symmetrically about the axis of said electrode with one another around the electrode.

3. A plasma cutting torch as claimed in claim 2, characterized in that in case the total restricted area of said plurality of orifices is expressed by S5n the relation between S5n and the restricted area S4 of the nozzle orifice of said nozzle is expressed by $S4 \geqq S5n \geqq \tfrac{1}{2} \times S4$.

4. A plasma cutting torch comprising: a gas current generator which is formed in a working gas passage defined between an outer peripheral surface of an electrode and an inner peripheral surface of a nozzle, said nozzle being disposed so as to surround the electrode and having a nozzle orifice formed at the leading end thereof so as to communicate with said working gas passage, and which has at least one orifice formed therein so as to extend substantially in parallel relationship with a longitudinal axis of said electrode; and a substantially cylindrical space potion formed on the upstream side of said nozzle orifice and having a diameter larger than the diameter of the nozzle orifice, wherein in case a restricted area of the orifice of said gas current generator is expressed by S5 and, on the other hand, a restricted are of the nozzle orifice is expressed by S4, the relation between the two areas is expressed by $S4 \geqq S5 \geqq \frac{2}{3} \times S4$.

5. A plasma cutting torch as claimed in claim 4, characterized in that sad gas current generator has plurality of said orifices disposed symmetrically about the axis of said electrode with one another around the electrode.

6. A plasma cutting torch as claimed in claim 5, characterized in that in case the total restricted area of said plurality of orifices is expressed by S5n the relation between S5n and the restricted area S4 of the nozzle orifice of said nozzle is expressed by $S4 \geqq S5n \geqq \frac{2}{3} \times S4$.

7. A plasma cutting torch as claimed in claim 4, characterized in that said space portion is comprised of multiple-stage space portions whose diameters are reduced stepwise towards the nozzle orifice.

* * * * *

UNITED STATES PATENT AND TRADEMARK OFFICE

CERTIFICATE OF CORRECTION

PATENT NO. : 5,140,130

DATED : August 18, 1992

INVENTOR(S) : Shun-ichi Sakuragi, et al

It is certified that error appears in the above-indentified patent and that said Letters Patent is hereby corrected as shown below:

Column 9, claim 4, line 11, "potion" should be deleted and replaced with --portion--.

Column 9, claim 4, line 16, "are" should be deleted and replaced with --area--.

Column 10, claim 5, line 4, "sad" should be deleted and replaced with --said--.

Column 10, claim 5, line 4, after "has", please insert --a--.

Signed and Sealed this

Twenty-sixth Day of October, 1993

Attest:

BRUCE LEHMAN

*Attesting Officer* *Commissioner of Patents and Trademarks*